United States Patent

[11] 3,588,676

[72] Inventors  Werner Tschopp
                Zurich;
                Toni Keller, Uster, Switzerland
[21] Appl. No. 761,974
[22] Filed      Sept. 24, 1968
[45] Patented   June 28, 1971
[73] Assignee   Spectrospin A. G.
                Zurich, Switzerland
[32] Priority   Sept. 27, 1967
[33]            Switzerland
[31]            13526/67

[54] SIGNAL GENERATOR FOR A NUCLEAR RESONANCE SPECTROGRAPH
     12 Claims, 6 Drawing Figs.
[52] U.S. Cl. .................................................. 324/0.5
[51] Int. Cl. ................................................... G01n 27/78
[50] Field of Search ........................................ 324/0.5, 77;
     331/178 (Inquired); 325/332—337

[56]                References Cited
                UNITED STATES PATENTS
2,983,870  5/1961  Wallace .......................... 325/333
3,435,333  3/1969  Wegmann ........................ 324/0.5

Primary Examiner—Michael J. Lynch
Attorney—Spencer and Kaye

ABSTRACT: A method and apparatus for generating a linear frequency sweep to obtain high resolution nuclear magnetic resonant spectra in a nuclear magnetic resonant spectrograph. The signal is generated by feeding a signal $f_s$ to a mixer which receives a signal $f_s + \epsilon$ from a controllable oscillator and feeds out a signal $\kappa$ into a phase detector. The phase detector receives a signal from a potentiometer via a voltage frequency converter, and feeds back a signal through the controllable oscillator via an amplifier. The signal $f_s + \epsilon$ is fed into a circuit including at least one additional potentiometer and voltage frequency converter, and is divided by a factor greater than unity in order to reduce the frequency sweep. The divided signal is then shifted by adding a suitable constant signal $f_k$ to it, so as to put the output signal into the range where nuclear magnetic resonance is obtained.

INVENTORS:
Werner Tschopp
Toni Keller

BY *Spencer & Kaye*

SIGNAL GENERATOR FOR A NUCLEAR RESONANCE SPECTROGRAPH

BACKGROUND OF THE INVENTION

The present invention relates to a method and apparatus for generating a linear frequency sweep for a nuclear magnetic resonance spectrograph.

In a nuclear magnetic resonance spectrograph which has its field stabilized by nuclear resonance, the linear sweep necessary to receive the nuclear magnetic resonance spectra is obtained by a sweep in frequency.

Various types of apparatus are known in the art which may serve to generate such a frequency sweep. One such type of apparatus, which is described in the Swiss Pat. No. 417,155, the equivalent of U.S. Pat. No. 3,435,333, issued Mar. 25, 1969 to Wegmann et al., is capable of providing linear sweeps up to ±15 p.p.m. (parts per million) of the median nuclear magnetic resonance frequency. This apparatus starts with a base frequency $f_0$ and obtains the median nuclear magnetic resonance frequency $m.f_0$ by multiplying the base frequency by a whole number $m$. A sweep frequency $\epsilon$ which is variable in the limits $0<\epsilon<15$ p.p.m. of $m.f_0$ is then added or subtracted from the frequency $m.f_0$.

Frequency variations up to 100 p.p.m. of the median resonance frequency are also known. The accuracy of the linear frequency sweep is here determined, on one hand, by the accuracy with which the frequency $\epsilon$ can be shifted within its sweep region and, on the other, by the stability of the median nuclear magnetic resonance frequency $m.f_0$ and the magnetic field. Where the magnetic field is stabilized by nuclear resonance, its stability is also, in turn, dependent on the stability of the frequency $m.f_0$.

As a result of advances in the technology of obtaining nuclear magnetic resonance spectra, not only the achievable resolution but also the stability of the frequency and the magnetic field has been improved to such an extent that the accuracy in the magnitude and the variation of the frequency $\epsilon$ produced by known methods and known apparatus is no longer sufficient for the highest requirements.

SUMMARY OF THE INVENTION

An object of the present invention, therefore, is to provide both a method and apparatus for generating, with increased precision, a signal having the linear sweep frequency $\epsilon$, so that the accuracy in the frequency sweep will match the currently obtainable accuracy in the other determinitive quantities involved in the measurement of nuclear magnetic resonance.

This object, as well as other objects which will become apparent in the discussion that follows, is achieved, according to the present invention, by generating a signal with the linearly variable sweep frequency $\epsilon$ which is small compared to the frequency at which the nuclear magnetic resonance spectra are obtained; dividing this sweep frequency by a factor $n$ which is greater than unity to reduce the frequency sweep range; and selectively shifting this reduced sweep range in the frequency range where nuclear magnetic resonance is obtained by adding at least one stable auxiliary frequency. This technique thus reduces the error in the sweep frequency by the factor $n$ while adding only the frequency error present in the auxiliary frequencies. Since the auxiliary frequencies are discrete frequencies, they can be produced with a minimum of error. As a result, the total error in the final sweep frequency will be considerably reduced.

In a preferred embodiment of the present invention, the apparatus for generating the linear frequency sweep is constructed as follows. Means are provided to generate a first signal having a linearly variable sweep frequency $\epsilon$ which is small compared to the frequency at which the nuclear resonance spectra are obtained. This signal can, for example, include a stable base frequency $f_s$ in addition to the sweep frequency $\epsilon$. Second means are provided to receive the output of the first means and divide its frequency by a factor $n$ which is greater than unity. This second means thus produces an output signal having the frequency $\epsilon/n$. Third means are then provided to generate a signal having selectable auxiliary frequencies $f_k$ and fourth means are connected to the second and third means to receive and mix their respective output signals and produce an output sweep signal having the frequency $$f_k + \frac{\epsilon}{n} \left( \text{or } f_s + f_k + \frac{\epsilon}{n} \right)$$

DESCRIPTION OF THE PREFERRED EMBODIMENTS

Figure 1:
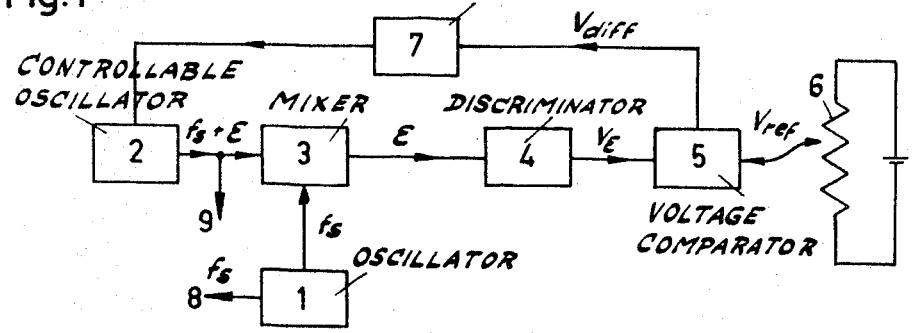
FIG. 1 is a block diagram of a circuit of the type known in the prior art for generating a linear frequency sweep for a nuclear magnetic resonance spectrograph.

Referring now to the drawings, FIG. 1 shows one type of apparatus known in the prior art for producing the frequency sweep in a nuclear resonance stabilized nuclear magnetic resonance spectrograph. In this apparatus a highly stable quartz oscillator 1 generates a signal of frequency $f_s$ which can serve both in the stabilization of the magnetic field and as the median frequency of the frequency sweep to obtain the nuclear magnetic resonance spectra.

A signal having a frequency close to $f_s$—namely $f_s+\epsilon$—is generated by a controllable quartz oscillator 2. This signal is compared with the signal having the exact frequency $f_s$ in a mixing stage 3 and the measured difference frequency $\epsilon$ passed to a frequency discriminator 4 which produces a DC voltage output proportional to the frequency $\epsilon$. This output $V_\epsilon$ is then compared in a passive difference element 5 with a reference voltage $V_{ref}$ selected with a potentiometer 6.

The reference $V_{ref}$ is made linearly variable by techniques which are well known in the art in a range which corresponds to the desired range of the sweep frequency $\epsilon$. The error or difference signal $V_{diff}$ is amplified by a DC amplifier 7 and employed to regulate the oscillator 2.

Whereas a signal having the fixed and stable frequency $f_s$ is produced at the output 8 to effect the nuclear resonance stabilization of the magnetic field, the signal which is produced at the output 9 exhibits a variable frequency $f_s+\epsilon$ which is controlled by the reference voltage $V_{ref}$. Although this sweep frequency was, in the past, sufficiently accurate to obtain nuclear magnetic resonance spectra, recent advances which increased the potential accuracy of a nuclear magnetic resonance spectrograph make it desirable to increase the accuracy of this sweep frequency.

Figure 2:
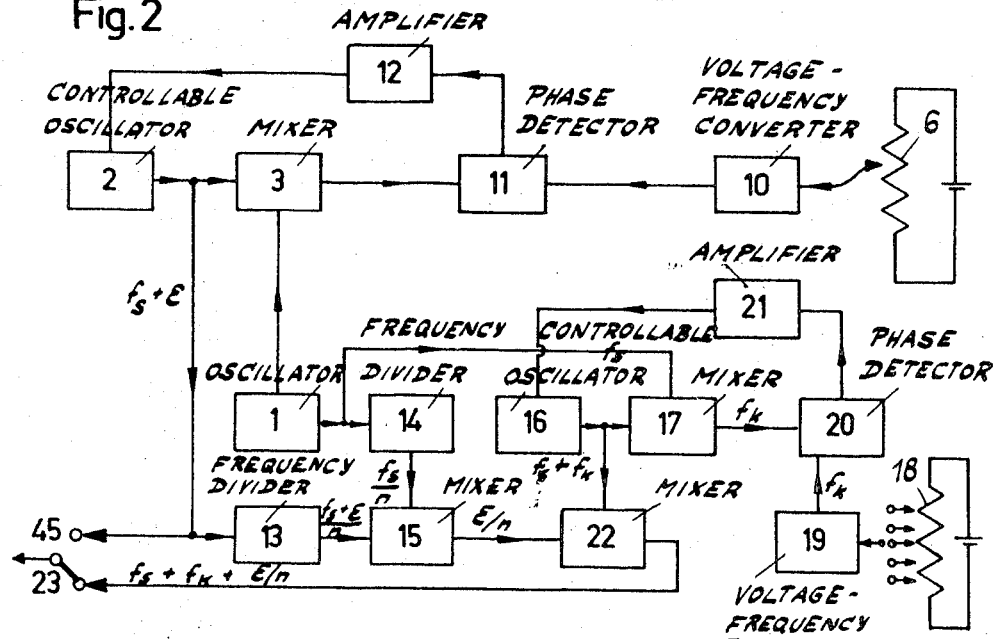
FIG. 2 is a block diagram of a preferred embodiment of a circuit for generating a linear frequency sweep, according to the present invention.

A first embodiment of the apparatus according to the present invention is illustrated in FIG. 2. The quartz oscillator 1, the controllable oscillator 2 and the mixer stage 3 remain unchanged from the apparatus shown in FIG. 1. However, the oscillator 2 is regulated by another technique. In this case, the reference voltage $V_{ref}$ obtained from the potentiometer 6 is converted to a frequency in a voltage-frequency converter 10. The output signal of this converter 10 is passed to a phase-sensitive demodulator 11 which compares its frequency with the frequency of the signal received from the mixer 3. The error signal, so produced, is amplified in the amplifier 12 and again employed to control the oscillator 2.

The signal having the variable frequency $f_s+\epsilon$, which is produced in this way, is then passed to a frequency divider 13 which divides its frequency by a whole number $n$. A similar frequency divider 14 is connected to the oscillator 1 and divides the frequency $f_s$ by the same number $n$. The two signals, produced by the frequency dividers 13 and 14, respectively, are then mixed in a mixing stage 15 to form a signal having the frequency $\epsilon/n$. The sweep frequency is thus divided by the factor $n$ which factor is chosen to be greater than unity.

A second controllable quartz oscillator 16 generates a signal having a frequency which likewise approximates the frequency $f_s$. This signal is compared in the mixer 17 with the exact frequency $f_s$ and the error signal passed to a phase detector 20. Another reference voltage, which is produced by a step-wise adjustable potentiometer 18, is converter to a step-wise variable auxiliary frequency $f_k$ in a voltage-frequency converter 19. This frequency $f_k$ is compared with the difference frequency obtained from the mixer 17. The error signal is amplified in the amplifier 21 and used to regulate the oscillator 16.

The resulting signal, which has the frequency $f_s+f_k$ is mixed in the mixer 22 with the signal having the sweep frequency $\epsilon/n$ and the output signal, which has the frequency $$f_s + f_k + \frac{1}{n} \cdot \epsilon$$

is passed to the output 23. The frequencies $f_s$ and $f_k$ which are easy to stabilize, thus appear with total error in the final frequency, while the variable frequency $\epsilon$, which is subject to greater error, is reduced by a factor of $n$.

Preferably, the fixed, adjustable or switchable auxiliary frequencies $f_k$ are chosen as follows:

$$f_0 = 0, f_1 = \frac{\epsilon}{n}, f_2 = \frac{2\epsilon}{n}, \ldots f_n = \epsilon, f_{n-1} = \frac{\epsilon(n+1)}{n}$$

As may be seen, the frequency range used to obtain the nuclear magnetic resonance spectra can now extend beyond the sweep range of the frequency $\epsilon$.

It is advantageous if the nuclear resonance spectrograph be constructed to selectively also operate with the frequency $f_s+\epsilon$. This design, which requires only an additional output, designated as 45 in FIG. 2, and a selector switch, makes it possible, when desired, to write the entire spectrum, with less precision, in a single sweep.

Figure 3:
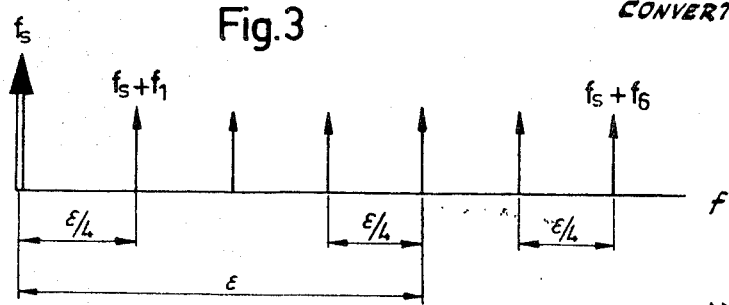
FIG. 3 is a graph showing exemplary output frequencies for the circuit of FIG. 2.

FIG. 3 provides a diagram showing an exemplary distribution of the frequency ranges for the apparatus of FIG. 2, for $n=4$ and $$f_k = k \cdot \frac{\epsilon}{n}$$

The embodiment described above in connection with FIG. 2 has the disadvantage that the frequency region in the immediate vicinity of $f_s$ is difficult to control because of interference between the stabilizing frequency and the frequency used to obtain the nuclear magnetic resonance spectra. These difficulties may be avoided by means of a second embodiment, according to the present invention, which employs an additional auxiliary frequency $f_h$.

Figure 4:
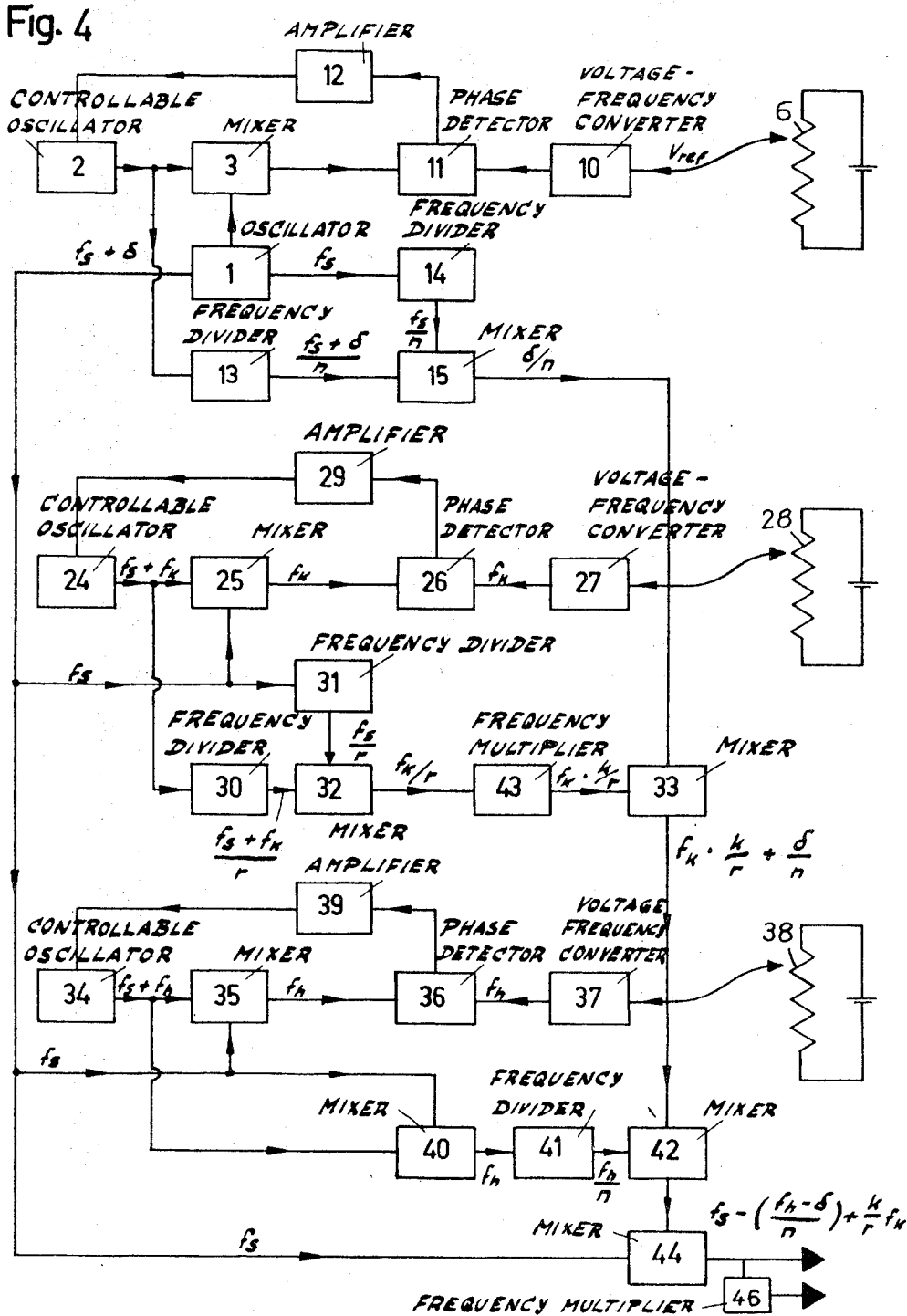
FIG. 4 is a block diagram of another preferred embodiment of a circuit for generating a linear frequency sweep, according to the present invention.

The block diagram for the second embodiment is illustrated in FIG. 4. The elements which are shown as blocks 1 to 15 have exactly the same function as the similarly designated blocks in FIG. 2; however, the sweep frequency produced with the aid of the reference voltage $V_{ref}$ selected by the potentiometer 6 does not correspond, in this case, to the final sweep frequency $\epsilon$ but is a variable auxiliary frequency $\delta$ with a likewise linear sweep. The mixer 15 thus produces the linearly variable auxiliary frequency $\delta/n$.

A controllable quartz oscillator 24 produces a signal having an approximate frequency $f_s+f_k$ and is stabilized on the frequency $f_s$ in the manner described above, with the mixer 25, the phase detector 26, the voltage-frequency converter 27, the reference voltage-producing potentiometer 28 and the amplifier 29. The signal, so produced, having the stabilized frequency $f_s+f_k$ is converted to a signal having the frequency $$(f_s - f_k) \cdot \frac{1}{r}$$

with the aid of a frequency divider 30 which divides the frequency by a factor $r$.

Another frequency divider 31 provides a signal with a frequency $f_s/r$ and both this signal and the signal with the frequency $$(f_s + f_k) \cdot \frac{1}{r}$$

are mixed in the mixing stage 32 to produce a signal having the frequency $f_k/r$. This latter signal is passed through a frequency multiplier 43, which multiplies its frequency by a factor $k$, to produce a signal with a frequency $f_k \cdot k/r$. The output of the frequency multiplier is then mixed with the output signal of the mixer 15 in a low frequency mixing stage 33, such as a ring modulator, to produce a signal with the additional frequency $$f_k \cdot \frac{k}{r} + \frac{\delta}{n}$$

In another system of the type described above, comprising a controllable oscillator 34, a mixer 35, a phase detector 36, a voltage-frequency converter 37, a reference voltage-producing potentiometer 38 and an amplifier 39, there is produced a signal having a frequency $f_s+f_h$. This signal, together with the signal of frequency $f_s$ are supplied to a mixer 40 to produce a signal having the frequency $f_h$. The output of the mixer 40 is connected to a frequency divider 41 which divides the frequency $f_h$ by a factor $n$ to produce a signal having the frequency $f_h/n$.

The resulting signal with the frequency $f_h/n$, as well as the output signal of the ring modulator 33, are mixed in a ring modulator 42. Finally, the output of the mixer 42 and the signal of frequency $f_s$ are passed through a mixer 44 which produces a signal having the frequency $$f_s - \left(\frac{f_h}{n} - \frac{\delta}{n}\right) + \frac{k}{r} \cdot f_k$$

This frequency (or, rather, frequencies) may then be used to obtain the desired nuclear magnetic resonance spectra.

The actual sweep frequency, the error of which has been reduced by frequency division, is now $$\frac{\epsilon}{n} = \frac{(f_h - \delta)}{n}$$

while the range of this sweep frequency may be shifted by the series of frequencies $k/r f_k$.

Figure 5:
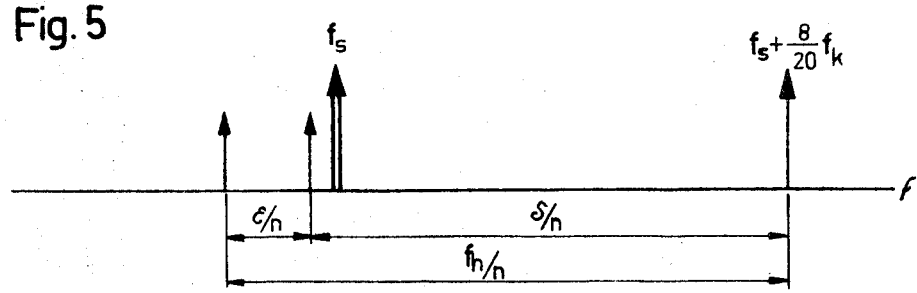
FIG. 5 is a graph showing exemplary output frequencies for the circuit of FIG. 4.
Figure 5:
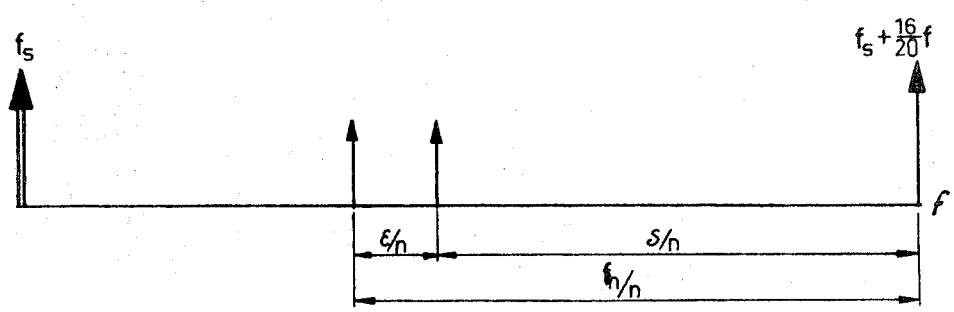
Figure 6:
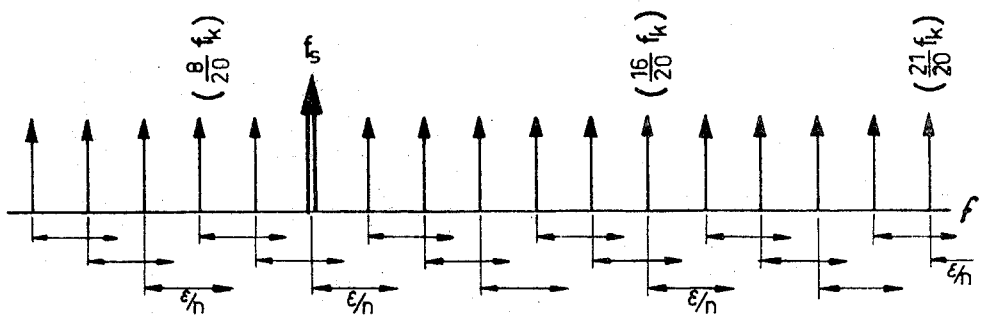
FIG. 6 is a graph showing exemplary output frequencies for the circuit of FIG. 4.

FIGS. 5 and 6 are frequency diagrams which illustrate the resulting frequency sweep produced by the apparatus of FIG. 4. In FIG. 5 the resulting range of the linearly variable sweep frequency $\epsilon/n$ is designated for two values of $k/r \cdot f_k$. The stabilization frequency $f_s$ is also designated to indicate the relative position of the sweep frequency. FIG. 6 shows a possible subdivision of the sweep frequency where $r=20$ and $$\frac{f_h}{n} = \frac{f_k}{2}$$

Either a part, or the whole spectrum range can be subdivided in this way into overlapping partial regions $\epsilon/n$. The frequency which is used to obtain the nuclear magnetic resonance spectra is thus made more accurate by the subdivision of $\epsilon = f_h - \delta$ and by coupling it to the stabilization frequency $f_s$.

The embodiment of the present invention shown in FIG. 4 has the advantage, with respect to the embodiment of FIG. 2, that both the frequencies $f_h$ and $\delta$ lie in a frequency range which is an order of magnitude larger than the range of $\epsilon$. These frequencies $f_h$ and $\delta$ are, therefore, easier to handle and the spectra region immediately adjacent to the stabilization frequency $f_s$ can be controlled without difficulty.

By choosing $r$ to be greater than $n$, as shown in FIGS. 5 and 6, it is further possible to make the precision $\epsilon/n$ regions overlap each other.

The embodiments shown and described above employ both low frequency division and mixing (in ring modulators) and high frequency division and mixing (or coupling). This is intentional, since the circuits for continuous low frequency division and mixing are simpler, while the circuits for high frequency division and mixing have the greater accuracy.

If the base frequency $f_s$ is not chosen to equal the stabilization frequency, but is only an $m$th part thereof, it is possible to match the sweep and the stabilization frequency to various strengths of magnetic field in the manner known in the art by multiplying the frequency $f_s$ of the output signal of the oscillator 1 as well as the frequency $$f_s - \frac{f_h - \delta}{n} + \frac{k}{r} f_k$$

produced by the apparatus of FIG. 4 by the quantity $m$. This may be accomplished, for example, by connecting a frequency multiplier 46 to the output of the mixer 44 in the apparatus of FIG. 4. In this way, for example, a base frequency $f_s$=5 MHz. may be converted to the frequencies 30, 60, 90 and 120 MHz. along with their associated sweep frequencies.

It will be understood that the above description of the present invention is susceptible to various modifications, changes and adaptations.

We claim:

1. In a nuclear resonance spectrograph for generating highly resolved magnetic nuclear resonance spectra having a constant magnetic field, receiver means and a linearly variable high frequency transmitter for exciting a sample to produce a signal in said receiver means, the improvement wherein said transmitter comprises:
   a. first means for producing a highly stable transmitting frequency $f_s$ in the range of the resonance frequencies of the spectra to be received;
   b. second means, connected to said first means, for generating a linearly variable sweep frequency $\epsilon$ which is small when compared to the highly stable frequency $f_s$;
   c. third means, connected to said first means and said second means, for receiving the frequency $\epsilon$ and dividing it by a factor $n$ which is greater than unity, for producing a first signal having a frequency $\epsilon/n$;
   d. a fourth means, connected to said third means, for generating a second signal having an auxiliary frequency $f_k$ which is small compared to the frequency $f_s$; and
   e. fifth means, connected to said first, third and fourth means, for mixing the transmitting frequency and the first and the second signals to produce a third signal having an accurate sweep frequency $$f_s + f_k + \frac{\epsilon}{n}$$

in any desired frequency range which third signal is transmitted to the sample.

2. The apparatus defined in claim 1, wherein said fourth means is stepwise adjustable for generating said second signal having a frequency of $$\frac{k \cdot \epsilon}{n}$$

where $k$=0, 1, 2, 3, ..

3. The apparatus defined in claim 1, wherein said fourth means is adjustable for generating said second signal having a frequency $f_k$ which is variable over a range which is greater than the range of said sweep frequency $\epsilon$.

4. The apparatus defined in claim 1, further comprising switching means connected to said second and said fifth means for selectively producing an output signal having a sweep frequency of $\epsilon$ and of $\epsilon/n+f_k$.

5. The apparatus defined in claim 1, wherein said fourth means is stepwise adjustable for varying said frequency $f_k$ in discrete steps, said frequency steps being smaller than the range $\epsilon/n$ of the divided sweep frequency $\epsilon$.

6. The apparatus defined in claim 1, wherein said second means includes, in combination:
   1. means for generating a fourth signal having a linearly variable sweep frequency $\delta$;
   2. means for generating a fifth signal having a fixed frequency $f_h$; and wherein said third means includes means for dividing said frequency $\delta$ and said frequency $f_h$ of said fourth and said fifth signals, respectively, by said factor $n$, and mixing the resultant signals for producing said first signal having the difference frequency $$\frac{f_h - \delta}{n}$$

7. The apparatus defined in claim 1, wherein said third means divides and mixes in the high frequency range.

8. The apparatus defined in claim 1, wherein said third means divides and mixes in the low frequency range.

9. The apparatus defined in claim 8, wherein said third means includes a ring modulator as a mixing stage.

10. The apparatus defined in claim 1, further comprising means, connected to said fifth means, for multiplying the frequency $\epsilon/n$ and the frequency $f_s+f_k$ of said third signal.

11. The apparatus defined in claim 1, wherein said second means includes, in combination:
    1. means for generating a sixth signal having the frequency $\epsilon$;
    2. means for generating a variable reference voltage;
    3. means, connected to said means of (2) above, for converting said reference voltage into a seventh signal having the reference frequency $\epsilon$;
    4. means, connected to said means of (1) and (3) above, for producing an error in response to differences in the frequency of said sixth and seventh signals; and
    5. means connecting said means of (4) above to said means of (1) above for controlling the frequency of said sixth signal with said error signal.

12. In a method for generating highly resolved nuclear resonant spectra with a nuclear resonance spectrograph by providing a constant magnetic field, transmitting a variable high frequency signal to a sample in the magnetic field and receiving a signal from the sample, the improvement comprising producing the variable high frequency signal by the steps of:
    a. generating a highly stable transmitting frequency $f_s$;
    b. generating a linearly variable sweep frequency signal $\epsilon$;
    c. dividing the sweep frequency signal $\epsilon$ by a factor $n$ greater than unity for reducing the frequency sweep range;
    d. generating an auxiliary signal $f_k$; and
    e. adding the auxiliary frequency signal and the highly stable transmitting frequency to the divided sweep frequency signal to selectively shift the reduced sweep range into the frequency range where nuclear magnetic resonance is obtained.